W. ULRICH & C. HACHMEISTER.
Harness Rosettes.
No. 6,643. Reissued Sept. 14, 1875.
FIG. I
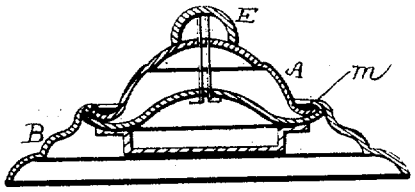
FIG II
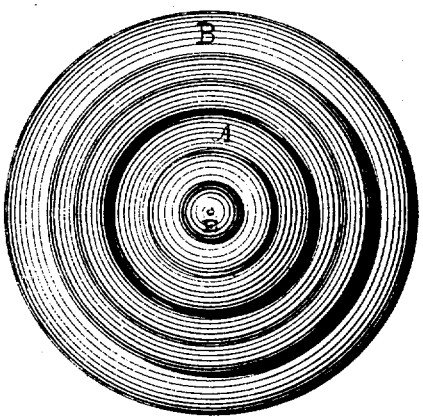
WITNESSES
F. B. Townsend
Jas. Brown.
INVENTORS
William Ulrich
Charles Hachmeister
By their attorney
R. D. O. Smith
THE NORRIS PETERS CO., PHOTO-LITHO., WASHINGTON, D. C.

UNITED STATES PATENT OFFICE.

WILLIAM ULRICH AND CHARLES HACHMEISTER, OF NEWARK, NEW JERSEY, ASSIGNORS TO ANDREW ALBRIGHT, OF SAME PLACE.

IMPROVEMENT IN HARNESS-ROSETTES.

Specification forming part of Letters Patent No. 90,610, dated May 25, 1869; reissue No. 6,643, dated September 14, 1875; application filed July 9, 1875.

*To all whom it may concern:*

Be it known that we, WILLIAM ULRICH and CHARLES HACHMEISTER, of Newark, Essex county, in the State of New Jersey, have invented certain new and useful Improvements in Rosettes for Harness; and we do hereby declare that the following is a full, clear, and exact description thereof, reference being had to the accompanying drawings, and to the letters of reference thereon marked.

Our invention relates to the manufacture of ornamental rosettes, such as are used for harness and other purposes; and chiefly consists in forming the lower part or base of the rosette out of metal, over which is placed a piece or boss of ornamented composition, such as hard rubber, which may be given the desired form and qualities in suitable dies; also, in providing the base with a recess or flange to receive and cover or contain the edge of the ornamented boss and retain the same.

In the drawing, Figure 1 shows a vertical section, and Fig. 2 shows a plan, of one form of our improved rosette.

B is the base-plate, made of metal. It may be shaped into any desired form by proper means, preferably by spinning. In the drawing this base B is shown with a compound curve. At *m* is shown a groove or recess, spun or formed in plate B, to receive the edge of boss A; A, the ornamented boss, which I prefer should be made of hard rubber, or other suitable compressible composition, formed or pressed in dies, so as to have the desired ornamental form, and the qualities of strength, solidity, and polish imparted by dies. This boss of compressible composition may be of any desirable ornamentation, color, or material susceptible of being properly worked. E is a bolt passing through plate B and boss A, and serves to secure the rosette in place when in use.

When the base B is provided with recess *m*, the edge of the boss A is forced therein, and the two parts are thus attached together.

Where the recess *m* is omitted the parts A and B are kept in their respective places by bolt E.

Our rosettes are at once cheap and beautiful. The contrast between the base of metal and the boss of another material is highly ornamental. The contrast is heightened when the bolt has a large head showing at the center of the boss.

We claim as our invention—

1. The combination, in a rosette, of a metal base-plate with a boss of compressible composition.

2. The combination, in a rosette, of a metal base-plate with a boss of compressible composition united by means of recess *m* or bolt E.

3. The combination, in a rosette, of the base-plate B with the hard-rubber boss A.

4. The combination, in a rosette, of base-plate B, having recess *m*, with a suitable boss or center-piece secured in said recess.

WILLIAM ULRICH.
CHARLES HACHMEISTER.

Witnesses:
ABRAHAM MANNERS.
R. J. D. DUNN.